Figures 1A, 2:
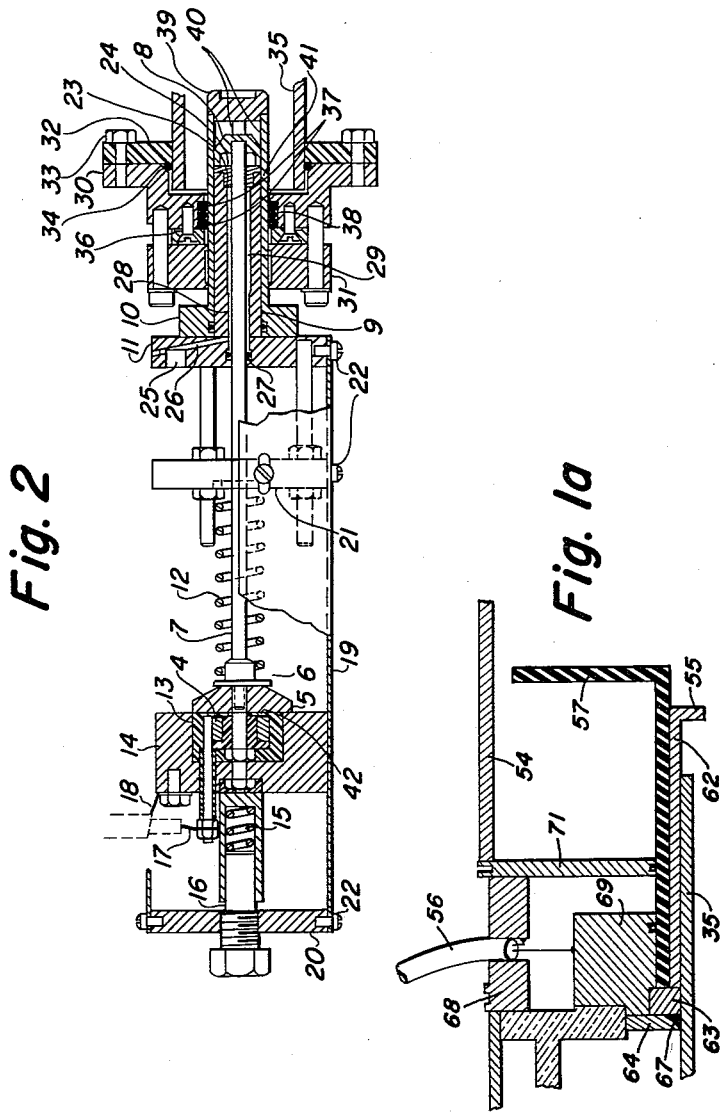

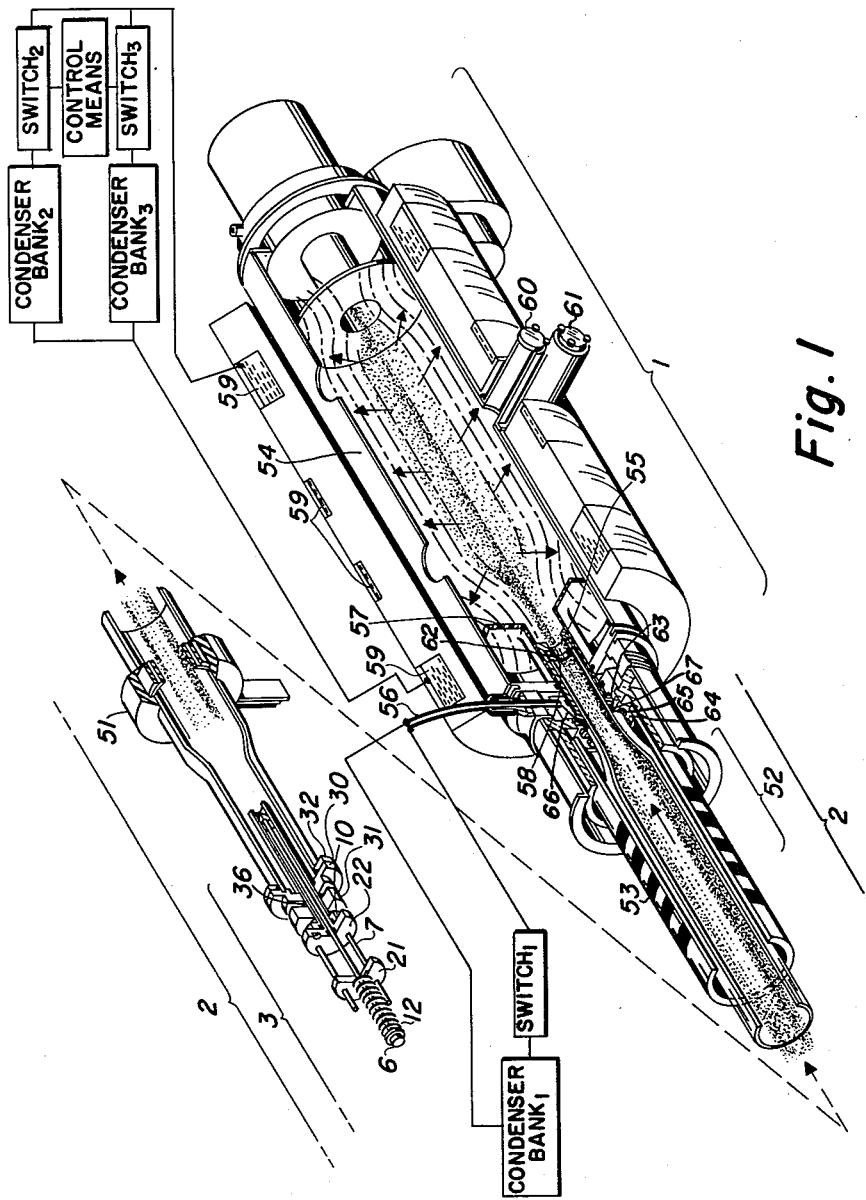
Fig. I
INVENTOR.
Darragh E. Nagle, Fred L. Ribe, Keith Boyer
Jay E. Hammel, Conrad L. Longmire, James L. Tuck INVENTOR.
Darragh E. Nagle, Fred L. Ribe, Keith Boyer
Jay E. Hammel, Conrad L. Longmire, James L. Tuck

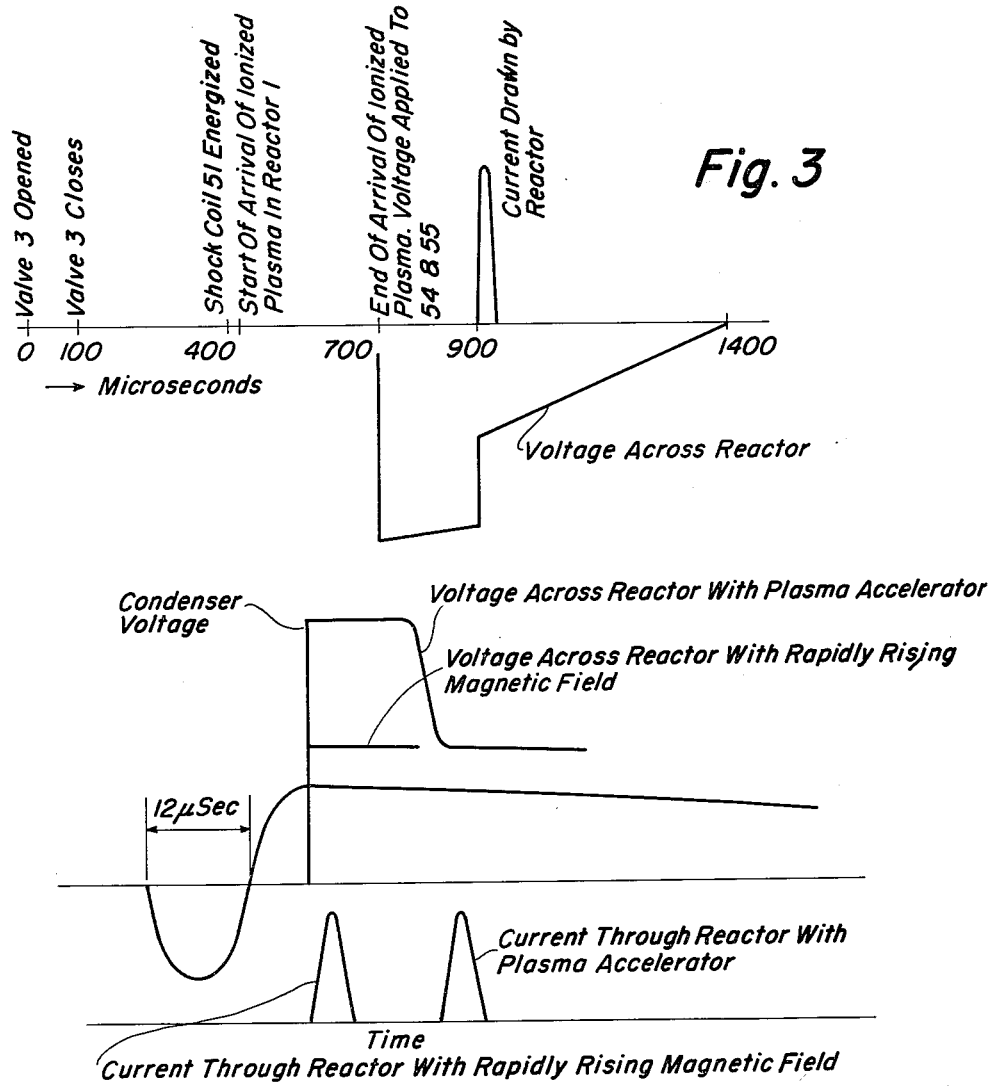

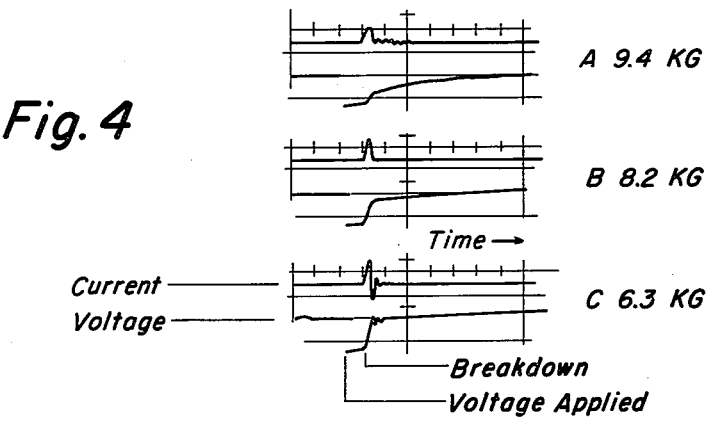
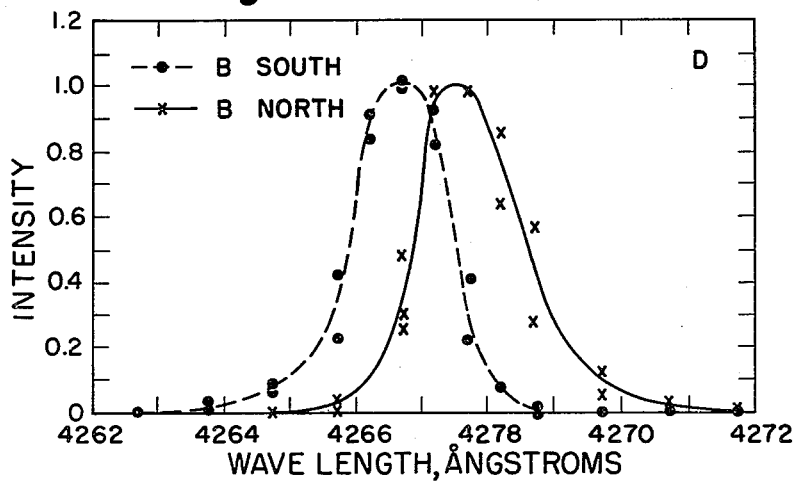

Oct. 24, 1961     K. BOYER ET AL     3,005,767
ROTATING PLASMA DEVICE
Filed Nov. 10, 1958                  6 Sheets-Sheet 5

WITNESSES:
Roy H. Smith, Jr.
Victor S. Laslo

INVENTOR.
Darragh E. Nagle, Fred L. Ribe, Keith Boyer
Jay E. Hammel, Conrad L. Longmire, James L. Tuck
BY
Roland A. Anderson
Attorney

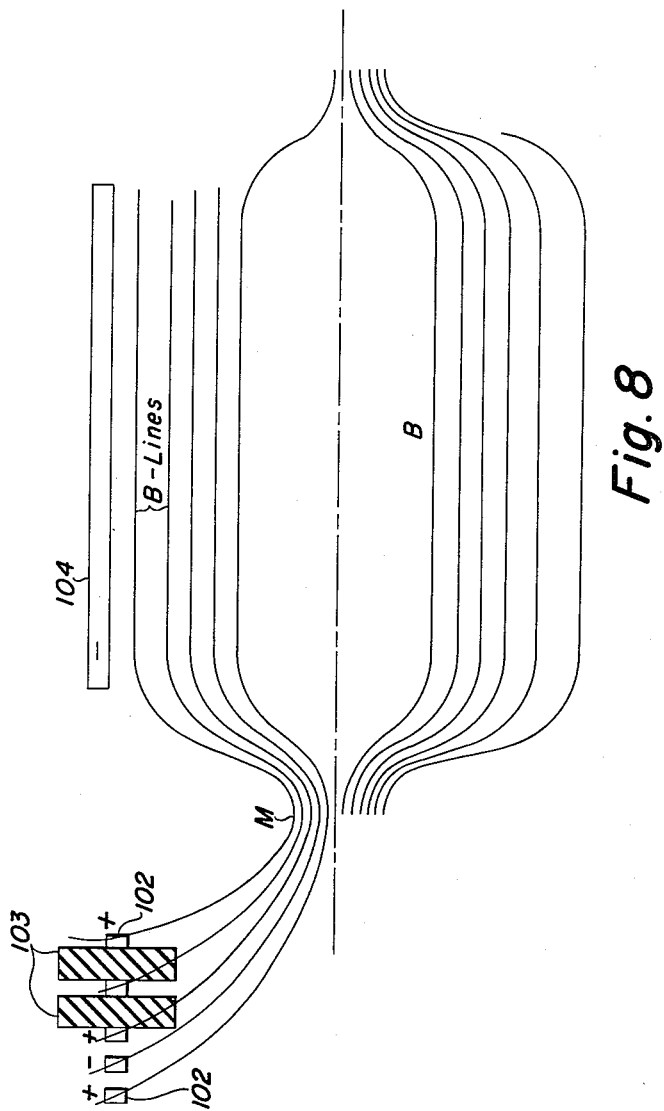

United States Patent Office

3,005,767
Patented Oct. 24, 1961

3,005,767
ROTATING PLASMA DEVICE
Keith Boyer, Jay E. Hammel, Conrad L. Longmire, Darragh E. Nagle, Fred L. Ribe, and James L. Tuck, all of Los Alamos, N. Mex., assignors to the United States of America as represented by the United States Atomic Energy Commission
Filed Nov. 10, 1958, Ser. No. 773,111
10 Claims. (Cl. 204—193.2)

The present invention relates to methods and means of obtaining nuclear reactions between ions of the light elements, e.g., between deuterium ions and between deuterium and tritium ions, to provide a source of neutrons and energetic charged particles, and to methods and means for obtaining light flashes of high intensity and short duration from ionized plasmas of such gases. It is more particularly directed to methods and means for obtaining such results which involve the drift of such ionized plasmas in a direction perpendicular to crossed electric and magnetic fields. It is also believed that the disclosure hereinbelow following that of the methods and means for accomplishing the abovementioned results is one of methods and means for obtaining a high rate of thermonuclear reactions, with more energy liberated than is required to ionize the gas and bring it to the necessary high temperature.

DEFINITIONS

Before disclosing the details of the present invention, we consider it advisable to list the meanings we attach to certain words and phrases used herein. This is considered necessary in the interest of clarity, for otherwise inferences may be drawn which we do not intend to imply.

*Controlled.*—Operable in a pre-determined manner to produce that which can be contained, or released without hazard. Main implication is that energy and radiations are not released violently or explosively.

*Fusion reactor.*—Apparatus operable to produce from the reaction of two or more thermonuclear fuel nuclides of mass number A one or more nuclides of mass number A+X, where $X \geqslant 1$. Although it is implied that the rate of such reactions increases as the relative velocities of such particles at the time of collision, nothing is implied about the means by which such pre-collision velocities are attained. The same reaction may and usually does produce one or more other particles such as neutrons or protons, in accordance with well-known reactions.

*Thermonuclear reactor.*—Apparatus in which fusion reactions occur primarily as the result of random collisions within the apparatus between gas particles having a Maxwellian distribution of velocities about some average temperature.

It is implied that such reactions are not the result of accelerating one particle into another. While it is also implied that a high average gas temperature is sought to attain a high thermonuclear reaction rate, nothing is implied as to the attainment of any minimum temperature.

*Net power-producing thermonuclear reactor.*—A thermonuclear reactor operable to make available for external use more energy per cycle of operation than is consumed in operating it. No restriction is implied as to the form of such energy, with only irretrievable losses such as radiation losses past all heat exchanger coolant channels, moderator blankets, etc., and thermal losses within the device being deducted. This usage appears to be justifiable even when all energy available for external use is the low grade form of energy, heat, and all of the energy supplied is electrical, as a net gain of the former over the latter obviously makes such apparatus superior to electrical heaters of the resistive conductor type.

*Net electrical power-producing thermonuclear reactor.*—This expression is reserved for thermonuclear reactors in which more electrical energy per cycle of operation is returned to the electrical system used to operate the reactor than such system supplied during such cycle, with the reservation that there may be a net loss for some cycles if the energy balance over a large number of cycles results in a net gain of energy.

*Plasma.*—A gaseous medium in which the original atoms have been at least partially ionized, i.e., separated into positive ions and electrons. While the unmodified expression does not imply a complete stripping of all originally neutral particles, this is to be understood when the temperature of the gas is such that no other state is possible.

*Ion.*—A gas particle having a net positive charge, i.e., stripped of at least one electron, including both atoms and molecules thus stripped. It is not used herein to include electrons.

*Thermonuclear fuel.*—Any mixture of the light element nuclides in which fusion reactions are known to occur, specifically deuterium, tritium, deuterium and tritium, helium-3 and deuterium, lithium-6 and deuterium, and lithium-7 and hydrogen-1.

In many of the devices proposed as thermonuclear reactors, the primary mechanism relied on for compressing and heating the gaseous fuel is the pinch effect. The primary difficulty with such devices is the inherent instability of the pinch. This instability causes the pinched fuel to expand and cool before there has been sufficient time for an adequate number of thermonuclear reactions, and much effort has been devoted to techniques for increasing the stability of the pinch. Such techniques make for increased complexity of the devices proposed by the addition of more structural elements and more associated electrical power supplies and control equipment.

In the present invention a different approach is adopted, one that avoids reliance on the pinch effect and its associated instability problems. The present invention relies principally on the fact that an ionized gas can be contained, thermalized and heated in a region of crossed magnetic and electric fields. Both such fields are applied externally, and there is no reliance on the self-generated magnetic field of the plasma current to compress and thereby heat the plasma.

It is therefore an object of the present invention to provide methods and means for obtaining fusion reactions between ions of hydrogen isotopes containing at least one neutron.

A further object is to provide such methods and means which are independent of the pinch effect in producing such reactions between hydrogen isotopes.

An additional object is to provide methods and means for creating an ionized plasma of a thermonuclear fuel, and for raising such plasma to a thermonuclear temperature by the use of crossed magnetic and electric fields to bring about fusion reactions between the positive ions of such plasma.

Another object is to provide a light source of high intensity and short duration by the creation of an ionized plasma and the rapid heating of such a plasma in a region of crossed electric and magnetic fields.

An additional and further object is to provide a neutron source in which neutrons are produced by fusion reactions between ionized hydrogen isotopes containing at least one neutron and in which such reactions are brought about by the force effects on such ionized isotopes of crossed electric and magnetic fields.

We are aware that structures and modes of operation providing crossed electric and magnetic fields are disclosed in the co-pending application of Josephson et al., SN–689,010, now U.S. Patent 2,868,991, also assigned to the Government of the United States. While the structure and mode of operation may be sufficient for the purposes there indicated it does not lend itself to a mode of operation similar to that of the present device and is, in general, unsuitable for use as a thermonuclear reactor.

One feature of the Josephson et al. structure which cannot be applied to embodiments of the present invention is the co-planar disposition of each magnetic field coil and an electric field electrode of a single potential. With such an arrangement, the fields are normal to each other only in a small region immediately adjacent each electrode and only in such small regions can an appreciable amount of energy be imparted to the ionized gas particles. In the bulk of the region between any pair of electrodes, the electric field is essentially parallel to the magnetic field. Particles in this region will be accelerated to the next electrode by the electric field and will be bent into azimuthal circular orbits by the force of the magnetic field. Such inter-electrode regions are inactive insofar as heating of the gas is concerned, and merely furnish increased opportunities for radiation losses.

An additional object is to provide methods and means for imparting kinetic energy to a plasm of thermonuclear fuel by causing such plasma to rotate in a region of crossed electric and magnetic fields, by which methods and means the plasma temperature may be raised to the point of high thermonuclear reaction rates.

The above and further objects are accomplished in the present invention by ionizing a low pressure gaseous fuel consisting of deuterium or deuterium and tritium and confining it in a region of crossed electric and magnetic fields. A cylindrical container elongated along the axis of revolution is used and the externally supplied magnetic field is made parallel to this longitudinal axis. By proper arrangement of the coils supplying this magnetic field, the flux lines are caused to converge at each end of the container to provide a higher flux density (or intensity) there than in the central bulk of the container, thereby taking advantage of the "magnetic mirror" type of arrangement.

The electric field is applied radially, so that it is perpendicular to the magnetic field throughout the container. In the earliest embodiment of our invention, this was accomplished by applying a voltage between a solid metaillic center rod located on the longitudinal axis and running the length of the container, and the cylindrical metal container. Although neutron bursts and light flashes were observed, the current flow through the device was a rapidly damped sinusoid of only about 10 microseconds duration, indicating that the plasma was contained for only a short time. Since that time, we have discovered that in the presence of a highly ionized plasma, each flux surface is an equipotential and hence that a solid longitudinal electrode is unnecessary. The potential of each flux surface is determined by end electrodes and the electric potential distribution therebetween. The experimental results disclosed below and the theory which follows it relate to an embodiment using such end electrodes.

Figure 7:
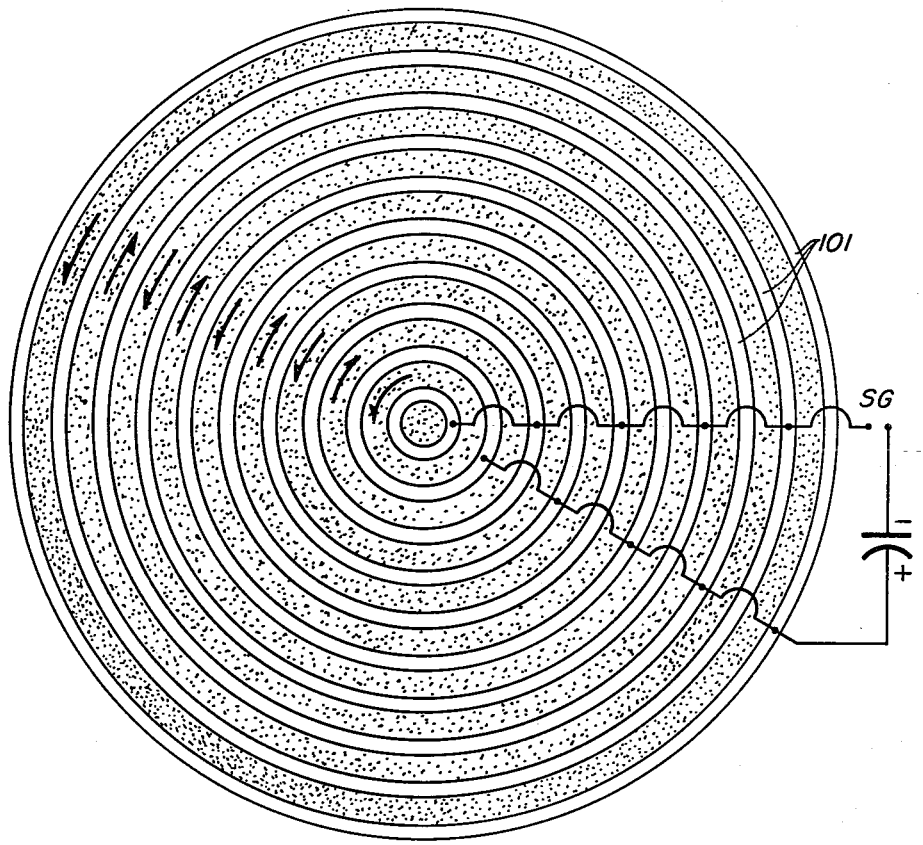

The structure and mode of operation of such embodiment and others will be more clearly understood by reference to the drawings hereby incorporated herein, in which FIGURE 1 is an isometric view of the above-mentioned embodiment using the gas container cylinder as one electrode and a co-axial ring electrode at each end to supply the radial electric field, and a plasma injector at one end to furnish a partially ionized plasma to the cylindrical container, FIGURE 1a is the top half of a vertical cross section through one end of the reactor 1, FIGURE 2 is a detailed cross section of the valve used to control the flow of gas into such plasma injector, FIGURE 3 is a graphical presentation of the method of operating the FIG. 1 embodiment, FIGURE 4 presents a series of graphs of the voltage and current relationships of the FIG. 1 embodiment under various test conditions, FIGURE 5 shows line profiles of $C^{II}$ 4267 A. light intensity versus monochromator settings for opposite directions of applied axial magnetic field, FIGURE 6 indicates graphically the results obtained by a different method of ionizing the fuel, comparable to parts A and B of FIG. 4, FIGURE 7 is a schematic end view of a second embodiment of the present invention, and FIGURE 8 is a schematic side view of the same embodiment.

Turning now to the drawings, an embodiment of the plasma reactors of the present invention useful as a neutron source and as a source of light flashes is indicated generically in FIG. 1 by the reference character 1. Shown connected to the reactor 1 is a plasma injector 2, which includes the valve 3, the latter being shown without the means for driving piston rod 7 in FIG. 1 but compelte in FIG. 2. This injector 2 is not in itself a part of the present invention, but serves as a means for injecting a partially ionized thermonuclear fuel into the reactor of the present invention. It is not essential to use such an injector, as any conventional means by which an inert gas may be admitted to the reactor 1 and then ionized in place, or any means by which such gas is ionized as it enters the reactor, e.g., a pair of electrodes energized by an RF source and disposed near the inlet orifice 58 to the reactor 1, will serve equally well. A means for accomplishing the first of these alternatives is disclosed below under the heading "Further Improvements."

The manner of making and using valve 3 can be more clearly understood by reference to FIG. 2, which shows an embodiment of this valve in longitudinal section. The main elements of this valve are the coil 4, aluminum anvil 5 securely affixed to the head 6 of the steel piston rod 7, the steel piston 8, brass inner sleeve 9, brass outer sleeve 10, brass end plate 11 and steel spring 12. Coil 4 is firmly embedded in epoxy resin 13 cast into brass cup 14, the latter being free to recoil to the left against recoil spring 15 and adjustable screw 16. Power is supplied to coil 4 from a 2–3 kilovolt capacitor by a timed ignitron, neither of which is shown, through the conductors 17 and 18 of a coaxial cable, lead 18 being connected to the inside turn of the spiral coil 4 through brass cup 14.

One sub-assembly of the valve 3 consists of the above-enumerated elements with the exception of outer sleeve 10, as held together by the cylindrical brass casing 19, end plates 11 and 20 and center support plate 21 being affixed thereto by screws 22 and inner sleeve 9 being held between piston 8 and end plate 11 by the tensile force of spring 12. Between piston 8 and the inside-shouldered end 23 of sleeve 9 there is a mating Teflon (polyperfluoroethylene) gasket 24 to provide a sealing engagement between the mating surfaces of these two parts. Gas is admitted from external tubing not shown into gas entry port 25 in end plate 11, conducted through passage 26 of the latter to its axial bore 27, the latter being oversize as shown to define an annular gas passageway surrounding piston rod 7. The bore 28 of sleeve 9 is likewise oversize to provide a similar passage surrounding piston rod 7, enlarged at the right side as shown to provide a larger annular space 29, the latter terminating upon contact with gasket 24.

The other sub-assembly consists primarily of the flanged brass plate 30, brass plate 31 and Bakelite plate 32, the latter being secured to plate 30 by screws 33 to compress rubber O-ring 34 and thereby secure the subassembly to the ceramic tube 35 of the body of the injector 2. Between plates 30 and 31 is a smaller brass plate 36, also secured to plate 30 by screws, the function of which is to compress Teflon gaskets 37 and O-ring 38 to provide a seal around outer sleeve 10. Plate 31 is made with a longitudinal saw cut and is drilled and threaded across such cut so that when an appropriate screw (not shown) is inserted and tightened, the cut will close and sleeve 10 will be firmly fixed in position.

For about an inch to the left of the solid cap 39 of sleeve 10, the walls of the sleeve are cut away to leave only four narrow ribs 40 connecting cap 39 and sleeve body 41. The left end of the opening is, of course, calculated to fall at or to the left of the gap left by the gasket 24 when the piston 8 and gasket 24 are moved to the right, and thereby to provide flow channels into the interior of the injector defined by the wall 35.

In operation, upon connecting coil 4 to its capacitor supply, a rapidly rising magnetic field is created. The magnetic flux on the right of the coil is squeezed into the narrow gap 42 (0.3 millimeter) between coil 4 and anvil 5. The expansion of this constricted field exerts a force on anvil 5 similar to a hammer blow, driving piston rod 7 to the right and compressing spring 12. Piston 8 and gasket 24 are driven to the right, permitting the flow of gas from passage 29 through the gap thereby created, between ribs 40 and into the chamber defined by wall 35. The cyclic time between opening and closing of the valve is approximately 100 microseconds, during which about 1 cm.$^3$ of deuterium at standard temperature and pressure may be admitted.

While it is apparent that an impulse from a hammer blow or a falling weight on anvil 5 would produce similar results, the use of an electromagnetic hammer as above has the advantage that it can be more closely coordinated with other electrical controls to provide an orderly sequence of command signals to the entire injector 2 and reactor 1.

The injector 2 is filled with a thermonuclear fuel, e.g., deuterium or a mixture of deuterium and tritium, by opening the electromagnetic valve 3. When the appropriate low gas pressure is achieved within the body 35 of the injector, the single turn shock coil 51 (see FIG. 1) is energized from a capacitor charged as high as 60 kv. and with a high frequency ($\sim$2 mc.). The effect of this pulse is to ionize a portion of the gas and cause a shock pulse thereof to be propagated down the tube toward the rarefied region within the reactor 1 (and also in the opposite direction). As the ionized plasma passes through the region 52 of the injector 2, it is guided and the walls are protected by the longitudinal magnetic field supplied by the solenoid 53, having an average strength of about 10 kilogauss. The front of this shock wave arrives in the reactor 1 almost immediately and rapidly fills the cylindrical region extending along the center line from end to end to form a "plasma center rod."

As illustrated in FIG. 1, the reactor 1 consists essentially of an elongated metallic cylindrical container 54 which serves as one electrode of the applied electric field E, illustrated by the radial arrows. The other terminal of the external power source, shown in FIG. 1 as condenser bank 1, is connected (through switch 1 to a pair of small ring-shaped electrodes 55, one at each end of the reactor, co-axial with the outer electrode 54, through five co-axial cables 56, only one of which is shown. A hat-shaped insulator 57 at each end prevents arcing between adjacent ends of electrodes 54 and 55. The inlet orifice 58 in the center electrode 55 at the feed end serves as the means for filling the reactor and the corresponding orifice at the far end is connected to a gas line for pumping down.

Referring to FIG. 1a, which shows the structural relationship of the ring electrodes 55, hat insulator 57, sleeve 62, clamping ring 63, sealing plate 64 and coaxial cables 56, the center electrode 55 which is provided with inlet orifice 58 is hermetically sealed to and electrically bonded with metallic sleeve 62. Metallic sleeve 62, in turn, is hermetically sealed to and electrically bonded with clamping ring 63. Clamping ring 63 is electrically connected with sealing plate 64 by means of connecting screws 65 (see FIG. 1). The outer conductor of coaxial cables 56 is electrically connected to plate 68, which in turn is electrically connected to plate 71 which in turn is electrically connected to container 54. The inner conductor of coaxial cables 56 is electrically connected to plate 69. Plate 69 in turn is electrically connected to ring-shaped electrode 55 through electrically conducting sleeve 62, sealing plate 64 and clamping ring 63. Sealing plate 64 and clamping ring 63 perform the dual function of providing electrical connection for electrode 55 and also the function of compressing plastic gasket 67 between sealing plate 64 and injector 2.

Surrounding the container 54 is a group of coils 59 to provide the longitudinal magnetic field within the reactor indicated by the series of lines made up of alternate long and short dashes. Coils 59 are disposed in such manner as to provide the magnetic mirror type of field illustrated, i.e., a high intensity field at the ends of the container and a somewhat lower intensity in the central region. As the manner of disposing the coils 59 to provide such a field, having any reasonable predetermined "mirror ratio," i.e., ratio of average intensity at the ends or mirrors to the average intensity in the central region, is a matter of straightforward engineering design by old and tested concepts, the details are not elaborated herein. A typical mirror ratio built into the embodiment of FIG. 1 is approximately 2.2. The coils 59 are energized by a separate power source, the system having such a long time period (e.g., a millisecond) relative to the other times of interest in opating the device that the magnetic field intensity may be regarded as constant.

Also shown in FIG. 1 are a pair of access ports 60 and 61 for obtaining observation on the behavior of the reacting plasma such as photographs, probe measurements, etc. Ports 60 and 61 are, of course, so designed and constructed as to prevent leakage of air into the low pressure interior of reactor 1. The upper port 60 is disposed to intersect the longitudinal axis of the reactor at the midplane of the ractor, while the lower port 61 is located about 11 cm. below the upper.

The particular design parameters and typical operational values used with the reactor of FIG. 1 embodiment are:

Material of container-electrode _____ Stainless steel.
Cross section of same _____ 24 cm. I.D.
Length of same _____ 86 cm.
External inductance _____ 0.1 $\mu$h.
Capacitance of capacitor bank system ___ 75 $\mu$f.
Voltage of same _____ 10–40 kv.
Vacuum prior to operation _____ 10$^{-3}$ $\mu$ Hg.
Filling pressure, deuterium _____ 1–1.5 $\mu$ Hg.
Magnetic field strength:
    At midplane _____ 9 gauss.
    At mirrors _____ 20 gauss.

In operating the FIG. 1 embodiment, the $B_z$ coils 59 and the guide field solenoid 53 are energized in series and sufficient time is allowed for the resultant fields to reach near maximum. The electromagnetic valve 3 of injector 2 is opened by a timing device (not shown) at the time point zero in FIG. 3. Deuterium gas flows into the injector for about 100 microseconds, whereupon the valve closes. At about 400 microseconds, the shock coil 51 is energized from a separate condenser supply (not shown). The current in the shock coil oscillates for about 50 microseconds at a frequency of 2 mc. before damping out.

In a very short time, perhaps 5 microseconds after energizing the shock coil 51, a luminous cylindrical region of plasma about 3 cm. in diameter is observed arriving in the reactor. This plasma establishes itself longitudinally between and in contact with the pair of center electrodes 55. Such live plasma continues to arrive for about 300 microseconds after shock coil 51 is energized. The neutral, unionized bulk of the gas flows into the reactor after the plasma rod until pressure equilibrium is established.

About 300 microseconds after energizing the shock coil 51, the electrodes 54 and 55 are connected to their capacitor bank through a massive switch such as a group of ignitrons or spark gaps. The full supply voltage is immediately impressed across the reactor, but initially decays very slowly as indicated by the voltage traces of FIG. 3. This gradual decay is caused by leakage in the circuit external to the reactor.

For about 200 microseconds after the application of the voltage to the reactor, little or no current is drawn, as is also apparent from FIG. 3. At the end of the 200 $\mu$sec. waiting period, which can be shortened or lengthened as the delay between plasma rod injection and voltage application is lengthened or shortened, a sudden discharge occurs. In the cases of parts A and B of FIG. 4, with midplane $B_z$ fields of 9.4 and 8.2 kilogauss, respectively, and a capacitor bank voltage of 10 kilovolts, the discharge is accompanied by (a) a sudden impulse of current having a peak value of about 20,000 amperes and lasting about 25 microseconds, a time sufficient to transfer most of the capacitor bank energy to the plasma, (b) a drop of the voltage across the reactor terminals to about one-half its original value as the condenser bank charge is shared with the reactor, and (c) intense emission of light, attributable to electron recapture in both atomic deuterium and in imprities. Following the current spike, the voltage decays exponentially to zero in about 500 microseconds.

With this type of voltage and current signature, the reactor presents an impedance to the external circuit which is partly capacitive and partly resistive, much the same as though it were an uncharged condenser suddenly connected to a charged condenser. Oscillations expected because of lead inductance are absent apparently caused as a result of the rapid damping effect of the plasma resistance as increased by the heating effect of the current.

The 200 microsecond waiting period is believed to be caused in part by incomplete ionization and in part by the formation of an electron sheath near the anode which absorbs the bulk of the potential gradient. Ionization is apparently completed by the azimuthal drift of electrons and their consequent collisions with neutrals, whereby their cyclotron energies can be quickly raised by multiple collisions from 1 ev. to 100 ev., at which energy they are very effective in ionizing neutral molecules. The electron sheath can apparently be controlled by the use of auxiliary end electrodes at intermediate radial positions between the pair shown to control the potential distribution by contact with the equipotential magnetic surfaces.

The long period of voltage standoff following the current impulse affords definite evidence that the plasma is confined and rotating under such conditions. If the plasma were not confined, the ionized particles would drift to the electrodes abruptly and the voltage would promptly fall to zero. This is indeed what happens slowly as the voltage gradually decreases to zero and is believed to be caused by an azimuthal energy transfer between positive ions and electrons. While such effect is relatively minor in that it takes considerable time to make itself felt, it can be counteracted by gradually increasing the strength of the $B_z$ field.

The voltage and current signatures in part C of FIG. 4 were obtained with an applied field of 6.3 kilogauss, measured at midplane, and capacitor voltage of 10 kilovolts. This type of behavior is obtained not only by decreasing the field strength from that used to obtain parts A and B of FIG. 4, but also by raising the voltage or increasing the pressure. The reactor here presents a high resistive type of impedance of a few hundredths of an ohm. The oscillatory nature of the voltage and current indicate a transfer of energy back and forth between the external inductance and capacitance. The rapid decay of voltage to zero indicates that the plasma is not contained, although the voltage for such complete breakdown or loss of containment varies according to a much lower power of $B_z$ than the second. Although this type of behavior imparts some ohmic heating to the plasma and some fusion reactions take place, as evidenced by the detection of neutrons at 10 kv., rising to about $10^5$ neutrons per discharge at 40 kv., the short containment time of about 25 microseconds, that required for the particles to reach the electrodes, causes an almost immediate transfer of such energy out of the plasma, and thus prevents the attainment of the very high temperatures required for a high rate of the thermonuclear type of fusion reactions. That such behavior can be expected by decreasing the magnetic field intensity is evident from the theory below, as this type of change increases the tangential drift velocity at the expense of the Larmor component. The Larmor radius is increased, and thereby both the opportunity for accelerating collisions and the likelihood of escape to the electrodes are enhanced. It can also be predicted by the containment Equation 10 of the theory below, which indicates that a reduction of B relative to E or the converse will result in loss of containment. A similar result is predicted by the same equation if the particle density N is increased without change in B or E.

Several experimental facts demonstrate that the present behavior of the FIG. 1 embodiment is strongly influenced by impurities. The discharge releases gas from the walls, the amount being about one micron in the case of the non-oscillatory discharges, and several microns for the other discharges. The analysis of spectrograms reveals about 30 spectral lines, among which those of H, $C^{II}$, $Fe^{I}$, $Si^{III}$, $Si^{II}$, and $O^{II}$ are prominent. Time resolved studies show the impurity light appearing very soon after the start of the current spike and lasting about as long as the current. For H and D the light lasts as long as 100 $\mu$sec. after the spike of current.

Time resolved studies of the light were made with a 0.5-meter Ebert type monochromator looking into the lower window 61 shown in FIG. 1, along a line perpendicular to the axis and 11 cm. below it at the median plane. Changing the wavelength setting of the monochromator in one or one-half-Angstrom steps on successive discharges, line profiles were obtained. The resolution of the monochromator was about 1.5 A. full width at half maximum. FIGURE 5 shows profiles of the line $C^{II}$ (4267 A.). The data were taken for $B_z$ pointing north (solid line) and $B_z$ south (dashed line) without any other changes. The lines are seen to be asymmetric and somewhat displaced from one another because of the Doppler effect of the plasma drift. The amount of Doppler shift here indicates a drift velocity of about $4 \times 10^6$ cm. sec.$^{-1}$, a result consistent with what we calculate from the applied electric and magnetic fields. It appears that the impurities are spinning.

In order to see how well the capacitance of the FIG. 1 embodiment could be predicted by the theory below, the following experiments were performed. Data of the type illustrated in FIG. 4A were taken for various values of applied magnetic field $B_0$, measured at midplane. The ratio $Q/V$ of the total charge transferred to Ixion divided by its voltage immediately after discharge was found to vary approximately as the inverse square of $B_0$ as predicted by Equation 15, although the exponent could be made to vary between 1.6 and 3.3, depending upon discharge conditions. For $B_0=8$ kilogauss and an injected $D_2$ pressure of 1.5 microns $Q/V$ was typically 42 microfarads.

In order to determine what portions of the charge Q corresponded to reversible initiation of plasma rotation and to irreversible processes, the following measurement was made. After the process of transfer of the charge Q to Ixion and while its voltage had the resulting value V, the reactor 1 was short circuited by means of a timed ignitron, and the amount of charge corresponding to the short circuit was measured. It was found that ⅕ of the original charge Q could be recovered, corresponding to the value 8.4 microfarads for its capacitance under the foregoing conditions of applied magnetic field and injected $D_2$ pressure. Assigning $F(\alpha)$ in Equation 15 the value 1.5, this capacitance corresponded to an amount of rotating deuterium plasma of equivalent pressure 5.6 microns. The discrepancy between this figure and the injected pressure of 1.5 microns may be accounted for either by the presence of impurities or by larger values for the enhancement function $F(\alpha)$ than would be calculated on the particular assumptions used in the theory.

THEORY APPLICABLE TO FIGURE 1 EMBODIMENT

Thinking in terms of cylindrical coordinates in which the z-axis coincides with the longitudinal axis of the elongated container described above, said container holds an ionized plasma, an axial magnetic field (Z-direction) and a radial electric field (r-direction), the third or azimuthal component of this cylindrical system being the $\theta$-direction. Ignoring dependencies on the Z-direction, the main drift of the charged particles will be in the tangential or $\theta$-direction, a result of the combination of electromagnetic and centrifugal forces. Assuming a low plasma density, realistic for embodiments of the present invention, the force exerted on any particle by the rest of the plasma is negligible and is neglected. To determine the nature of the orbits, it is assumed in the following that an ion has only an azimuthal velocity $v_d$ and that an electron has only a corresponding azimuthal velocity $v_e$. With positive ions of mass M, charge $e$, and electrons of mass $m$, charge $-e$, a balance of radial forces requires that $$F \text{ (ions)} = 0 = eE + \frac{eBv_d}{c} + \frac{Mv_d^2}{R}$$

and $$F \text{ (electrons)} = 0 = -eE - \frac{eBv_e}{c} + \frac{mv_e^2}{R}$$

where the electrical field gradient E is directed inward to the center, a common clockwise direction of rotation has been assumed for ions and electrons, and the magnetic field direction is such that the magnetic field exerts an outward force on the ions. Solutions of these equations for the particle velocities have two brances each.

(1) $$v_d = \frac{eBR}{2Mc}\left[-1 \mp \sqrt{1 - 4\frac{\frac{cE}{B}}{\frac{eBR}{Mc}}}\right]$$

(2) $$v_e = \frac{eBR}{2mc}\left[1 \pm \sqrt{1 + 4\frac{\frac{cE}{B}}{\frac{eBR}{mc}}}\right]$$

In each of the solutions, the upper alternative sign of the radical implies the cyclotron branch of the motion. This is apparent if the electric field gradient is very small, for under these conditions the velocity will be the cyclotron velocity, $$-\frac{eBr}{Mc}$$

for ions and $$+\frac{eBr}{mc}$$

for electrons. The lower sign of the radical implies the drift branch of the solution, since it reduces to $$-\frac{cE}{B}$$

for small E, both ions and electrons drifting circumferentially in the same direction. The actual azimuthal velocities at the moment shown in FIG. 1 are thus a composite of the two branches. Using the notation $v_{dd}$ and $v_{ed}$ for the drift components and $v_{dc}$ and $v_{ec}$ for the cyclotron components.

$$v_{dd} = \frac{eBR}{2Mc}\left[-1 + \sqrt{1 - 4\frac{\frac{cE}{B}}{\frac{eBR}{Mc}}}\right]$$

$$v_{ed} = \frac{eBR}{2mc}\left[1 - \sqrt{1 + 4\frac{\frac{cE}{B}}{\frac{eBR}{mc}}}\right]$$

By defining $$v_L = \frac{eBR}{2Mc} \text{ and } v_E = \frac{cE}{B}$$

it is possible to simplify these relationships to:

(3) $$v_{dd} = \frac{v_L}{2}\left[-1 + \sqrt{1 - 4\frac{v_E}{v_L}}\right]$$

(4) $$v_{ed} = \frac{M}{m}\frac{v_L}{2}\left[1 - \sqrt{1 + 4\frac{m}{M}\frac{v_E}{v_L}}\right]$$

With $v_E/v_L \ll 1$, a condition also prevailing in embodiments of the present invention, the radicals may be expanded and all second order and higher terms in $v_E/v_L$ ignored, as follows:

$$(1 - 4v_E/v_L)^{1/2} = 1 - 2v_E/v_L + (v_E/v_L)^2 - \ldots \simeq 1 - 2v_E/v_L$$

$$\left(1 + 4\frac{m}{M}v_E/v_L\right)^{1/2} = 1 + 2\frac{m}{M}v_E/v_L + \left(\frac{m}{M}v_E/v_L\right)^2$$

$$+ \ldots \simeq 1 + 2\frac{m}{M}v_E/v_L$$

It is then apparent that $$v_{dd} \simeq -v_E = -\frac{cE}{B}$$

and $$v_{ed} \simeq -v_E = -\frac{cE}{B}$$

or the ion and electron drift velocities at a radius R are identically directed azimuthally (counter-clockwise) and have approximately the magnitude of the drift velocity in a planar system, where a uniform electric field exists between a pair of oppositely charged flat plates and a uniform magnetic field exists between and parallel to such plates, i.e., they are independent of radius.

Superimposed on this azimuthal drift is a cyclotron mode of motion about the circle of radius R as a guiding center. If the particle is born with no initial velocity component across tthe magnetic field, as can occur in embodiments of the present invention, this cyclotron velocity has a magnitude equal to the drift velocity and the complete particle trajectory is a cycloid wrapped about the guiding center on the outside for ions and on the inside for electrons. The radius of gyration is then calculable from the relation $$v_o = \frac{\frac{eBr_d}{Mc}}{\frac{eBr_d}{Mc}} = v_d = \frac{cE}{B}$$

or (5) $$r_d = \frac{c^2 M E}{e B^2}$$

and (6) $$r_e = \frac{c^2 m E}{e B^2}$$

indicating a smaller radius of gyration for electrons because of their smaller masses. When the particle is born with an initial transverse velocity component, the orbit is in the nature of a trochoid.

MAGNITUDE OF BORE

As is apparent from Equations 1 through 4 above, a large bore radius will permit a larger $$v_L = \frac{eBR}{Mc}$$

without affecting $$v_E = \frac{cE}{B}$$

This means that the drift component $v_{dd}$ of the particle velocities will tend closer and closer to the value $v_E$ as the radius is increased and that the Larmor component $v_{dc}$ will tend more nearly to the value $$\frac{eBr}{Mc}$$

For ions, the change in drift velocity with increasing radius is a decrease, while the change in Larmor velocity is an increase. The result is that more of the available energy is used for thermalizing, i.e., bringing the plasma to a high temperature, and less is stored in the magnetic field of the drift currents.

CIRCUIT BEHAVIOR

Under the inherent plasma condition of electric charge neutrality, the number of ions per unit volume $N_d$ equals the number of electrons per unit volume $N_e$ in the main body of the plasma, or $N_d = N_e = N$. Since the motion of ions and the motion of electrons in the same direction are subtractive electric currents, a net azimuthal current exists, the density of which is $$j_\theta = \frac{N_e}{c}(v_d - v_e)$$

or $$j_\theta = -\frac{N_e}{c}\left(\frac{v_d^2}{v_L} + v_E + \frac{m}{M}\frac{v_e^2}{v_L} + v_E\right)$$

$$= -\frac{N_e}{cv_L}\left(v_d^2 + \frac{m}{M}v_e^2\right)$$

(7) $$= -\frac{NM}{BR}\left(v_d^2 + \frac{m}{M}v_e^2\right)$$

This diamagnetic current creates a magnetic field which opposes the applied field in the central region in accordance with Lenz's law, thereby creating an outward magnetic pressure gradient which helps to balance the centrifugal body forces. If the inner electrode radius is designated "$a$," the inside radius of the outer electrode "$b$," and the applied electrostatic potential "$\phi$," the electric field gradient in the plasma is given by (8) $$E(R) = \frac{\phi}{\ln(b/a)}\frac{1}{R}$$

The magnetic field distribution in the plasma after drift motion has commenced is found by solving the curl-B Maxwell equation together with the equations for drift current density and electric field gradient, Equations 7 and 8. By taking the particle density N independent of radius and expanding $v_d$ and $v_e$ in powers of $v_e/v_L$, retaining only first order terms as before, the solution is (9) $$B^4(R) = 8\pi\left(1 + \frac{m}{M}\right)\left(\frac{\phi}{\ln\frac{b}{a}}\right)^2 NMc^2\left(\frac{1}{a^2} - \frac{1}{R^2}\right)$$

This solution satisfies the condition that the magnetic field be completely cancelled at $R = a$ and may be taken as a criterion for magnetic containment. It leads to the following relationship between the applied electrostatic field and the magnetic field $B(b)$ at the outer electrode:

(10) $$\left(1 + \frac{m}{M}\right)\left(\frac{\phi}{\ln\frac{b}{a}}\right)^2 = \frac{B^4(b)}{8\pi NMc^2}\frac{a^2 b^2}{b^2 - a^2}$$

As an example of the use of this equation, a value of $B(b) = 10$ kilogauss and an average applied electric field of 64 e.s.u. indicates a maximum containable particle density of about $2 \times 10^{13}$ cm.$^{-3}$.

The initial applied magnetic field $B_0$ may be related to the field distribution of Equation 10 by assuming that the flux inside the machine is the same before and after the onset of plasma drift. Such an assumption yields the relationship

(11) $$B_0 = \frac{2}{b^2 - a^2}\int_a^b rB(r)\,dr$$

In the system under consideration the net change in magnetic energy density and the particle kinetic energy density are, respectively,

(12) $$w_B = \frac{B^2 - B_0^2}{8\pi}$$

and

(13) $$w_p = 1/2 N(m + M)v_E^2$$

The total energy per unit length is that of a capacitor with capacitance per unit length given by

(14) $$C = \frac{1}{\phi}\frac{\partial}{\partial \phi}\int_a^b 2\pi r(w_B + w_p)\,dr$$

By use of Equations 3, 8, 9, 12 and 13 this result may be expressed in the form

(15) $$C = 2\pi\left(1 + \frac{m}{M}\right)(\ln \alpha)^{-1}\frac{NMc^2}{B_0^2}F(\alpha)$$

where $$\alpha = b/a$$

$$F(\alpha) = 2\gamma^2(\ln \alpha)^{-1}\int_1^\alpha \frac{(1-\gamma^4)x^2 - 1}{\gamma^2 x + \sqrt{x^2-1}} + \frac{1}{2\sqrt{x^2-1}}dx$$

and $$\gamma = \frac{2}{\alpha^2 - 1}\int_1^\alpha \sqrt{x^2(x^2-1)}\,dx$$

The effective dielectric constant is given by

(16) $$\epsilon = 4\pi\left(1 + \frac{m}{M}\right)\frac{NMc^2}{B_0^2}F(\alpha) = \epsilon_p F(\alpha)$$

Thus the usual dielectric constant $\epsilon_p$ of the polarized plasma is modified by the factor $F(\alpha)$, which depends upon the geometry of the system. A numerical evaluation of the above definition of $F(\alpha)$ for $\alpha = 4$ and $\alpha = 8$ gives the values 1.49 and 1.46, respectively. It is seen that the centrifugal effect leads to an enhancement of the dielectric constant.

MIRROR CONFINEMENT

In the illustrated embodiments of the present invention discussed above, use is made of what is known as the "mirror effect." The applied magnetic field is shaped in such manner that it has a relatively small intensity $B_c$ at the central region of the fuel reaction chamber 54 and a larger intensity $B_m$ at the ends of such region. The effect of the high intensity fields is to decrease the velocity of an entering particle in the direction parallel to the field and to increase its velocity in a direction perpendicular to the field, reversing the axial motion of the particle under the proper conditions. The basic equations for such magnetic mirror effects have been derived by Post in Rev. Mod. Phys. 28, 338 (July 1956) at pp. 353–355. In his Equation 71, p. 355, Post sets forth the equation for the energy corresponding to the axial velocity at the mirror, using the notation "2" for the high intensity of mirror region and "1" for the region of weaker magnetic field in the center part of a mirror machine. By applying to this equation the condition that $w_{||}(2) \geq 0$ if the particle is to leak through the mirror, it is apparent that for leakage $$w_{||}(1) \geq w_\perp(1)(H_2/H_1 - 1)$$

or, in the present notation,

(17) $\quad w_{||}(c) \geq w_\perp(c)(B_m/B_c - 1)$

It will now be shown that in the embodiments of the present invention the azimuthal drift currents or rotating plasma enhances the mirror effect to make particle leakage more difficult. The magnetic field, which has no $\theta$-component and which has axial symmetry, can be derived from a vector potential of the form $$\vec{A} = A(R,z)\hat{e}_\theta$$
$$\vec{B} = \text{curl } \vec{A}$$

It is convenient to define a flux function by the relation

(18) $\quad \psi(R,z) = e/cR\, A(R,z)$ which implies that $(2\pi c/e)\psi$ is the flux enclosed by a circle of radius R. The potential energy of a particle of charge $e$ is given by

(19) $\quad V(R,z) = e\phi(R,z)$ where $\phi$ is the electrostatic potential. B lines are assumed to become approximately equipotentials due to the free longitudinal motion of electrons. It follows that $V = V(\psi)$. The Hamiltonian of a particle under the influence of these fields is

(20) $\quad H = \dfrac{p_z^2}{2M} + \dfrac{p_R^2}{2M} + \dfrac{(p_\theta - \psi)^2}{2MR^2} + V$ where $p_z$, $p_R$, and $p_\theta$ are the canonical momenta appropriate to the cylindrical coordinate system. Since H is independent of $\theta$, $p_\theta = mR^2\dot\theta + \psi$ is a constant of motion. Therefore, Equation 20 may be regarded as the Hamiltonian of a particle moving in two Cartesian dimensions in an effective potential $v$ given by the sum of the last two terms in Equation 20. We shall assume that the particle is positively charged, so that $v$ is positive.

We first consider the case $V = 0$. Particles start their cycloidal orbits from rest, and hence positive particles have positive $p_\theta$. For a given value of z, $p_\theta - \psi$ will then vanish at some radius. The effective potential $v$ also vanishes and thus has a minimum at this radius. The locus in the R-z plane of these minima forms the centerline of a potential trough, with the centerline following a B-line. The two-dimensional particle moves in this trough, oscillating between the two flux surfaces for which $v$ equals the total energy.

If there is an applied electric field, the equipotential surfaces of $v$ will be altered. For a given value of z, the minimum of $v$ occurs where $\partial v/\partial R = 0$. From the form of $v$ it follows that this condition holds when the relation

(21) $\quad p_\theta - \psi = \dfrac{MRv_L}{2}\left[-1 + \sqrt{1 - \dfrac{4v_E}{v_L}}\,\right]$ is satisfied, where $v_L = eB_zR/Mc$, $v_E = E_r/B_z$ as before. If $E_r$ were zero, this would give the minimum at $\psi = p_\theta$ as above. Comparing with Equation 3, we see that motion along the bottom of the potential trough implies that the expression

(22) $\quad p_\theta - \psi = -MRv_D$ is satisfied. Since $-MRv_D = L_D$, the angular momentum of the drift motion, Equation 22 states that

(23) $\quad L_D + \psi = p_\theta = \text{constant}$

Thus the quantity $L_D + \psi$ is an adiabatic invariant for the general drift case, a well-known result which can be proved in a variety of ways and which can be used directly to calculate the centrifugal confinement effect of the mirror fields. If E(R) is negative (outer electrode positive), the sign in Equation 22 can be shown to lead to an orbit which moves outward across flux surfaces as it enters the mirror region, and conversely.

To calculate the mirror confinement effect in the presence of the E×B rotation it is convenient to perform a transformation to eliminate the radial electric field. This is done by introducing an equivalent flux function $\psi'$ which includes the radial dependence of V. For given $p_\theta$ and $z, \psi'$ is defined by the relation

(24) $\quad \dfrac{(p_\theta - \psi)^2}{2MR^2} + V(R,z) = \dfrac{(p_\theta - \psi')^2}{2MR^2} + K(z)$ where K(z) is the minimum value of the lefthand side for the given value of z. This allows $p_\theta - \psi'$ to vanish at the minimum, and allows $\psi'$ to be a smooth, monotonic function of R, as is required of a flux function. Equation 20 becomes

(25) $\quad H = \dfrac{p_z^2}{2M} + \dfrac{p_R^2}{2M} + \dfrac{(p_\theta - \psi')^2}{2MR^2} + K(z)$ corresponding to the Hamiltonian of a particle in a mirror magnetic flux distribution $\psi'$ and an axial electric field with potential K(z). The mirror reflection problem is reduced to that of finding the effect of K(z). We first determine K(z) in the approximation $v_E/v_L \ll 1$. This is done by expanding $(p_\theta - \psi)^2/2MR^2$ and V about the point $R = R_0$. A brief calculation then shows that K(z) is the negative of the term $(p_\theta - \psi)^2/2MR^2$ evaluated at the minimum of $v$, and hence Equation 22 enables us to write

(26) $\quad K(z) = -1/2 M v_E^2$ where $v_E$ is the E×B drift velocity evaluated on the same $\psi'$ flux surface for each z. On a given flux surface, $B \propto 1/R^2$ and $E \propto 1/R$ so that $K(z) \propto -1/B(z)$. Thus K(z) is more negative in the center of the machine than in the mirror, leading to a suppression of particle leakage. To evaluate this effect quantitatively we use the law of energy conservation for motion along a flux tube in the form

(27) $\quad w_\perp(c) + w_{||}(c) + K(c) = w_\perp(m) + w_{||}(m) + K(m)$ where $w_\perp$ and $w_{||}$ are the perpendicular and parallel kinetic energies, and c refers to the center and m to the mirror. From adiabatic theory we have

(28) $\quad w_\perp(m) = w_\perp(c) B_m/B_c$

In order to pass through the mirror, a particle must have $w_{||}(m) \geq 0$. By use of Equations 26, 27 and 28, and the relation $K(z) \propto -1/B(z)$ this condition becomes

(29) $\quad w_{||}(c) \geq w_\perp(c)(B_m/B_c - 1)$
$\quad\quad\quad + 1/2 M v_E^2(c)(1 - B_c/B_m)$ Comparing this result with Equation 17, the last term gives the effect of K(z), making it more difficult for a particle to leak. Physically, the improved containment arises from the centrifugal force of the $\overline{E \times B}$ rotation which keeps particles from approaching the axis, as they must in order to pass through the mirror. In embodiments of the present invention, $1/2Mv_E^2$ may be about equal to the total Larmor or cyclotron energy $w_\perp$.

FURTHER IMPROVEMENTS

Our continuing investigations have resulted in the discovery that the plasma injector 2 used with the FIG. 1 embodiment can be dispensed with if the coils 59 used to supply the longitudinal field is properly energized and controlled. Since the primary purpose of the plasma injector is to supply the gaseous fuel in a partially ionized state, any means by which such ionization can be accomplished after the reactor is filled with the gas is equally effective.

Such ionization can be accomplished in embodiments of the present invention by applying the longitudinal magnetic field very rapidly. This is accomplished by energizing the coils 59 from condenser bank$_2$ through switch$_2$, see FIG. 1, such that the time period of the energizing system is very short. In the system actually used, this period was 24 microseconds. Near the end of the first half-cycle, the rapidly time-changing magnetic field causes the gas to ionize. At the peak of the second half-cycle, when the coil current and magnetic field intensity are at their maxima, the coil is "crow-barred" or short-circuited by connecting it through associated control means to a second condenser bank and switch, shown in FIG. 1 as condenser bank$_3$ and switch$_3$, such that the de-energizing system has a very long time constant, e.g., 150 μsec., long enough to allow completion of the fusion reactions before appreciable decay of the magnetic field intensity from its peak value.

This method has been so successful that the "waiting period" illustrated in parts A and B of FIG. 4 has been completely eliminated. The voltage and current signatures are illustrated in FIG. 6, together with those of FIG. 4A and 4B and the longitudinal magnetic field. As can be seen there, the technique of applying a rapidly rising magnetic field prevents a period of standing off the full condenser voltage and causes an immediate pulse of current through the reactor, followed by a long period of sharing the original voltage and thus the original energy of the condenser.

USE AS THERMONUCLEAR REACTOR

The theoretical development above and the confirmatory results also disclosed indicate that embodiments of the present invention can be modified for operation as thermonuclear reactors. By considering the containment Equation 10 above, by assuming that the average Larmor energy equals the drift energy, and that the latter can be approximated as $$\frac{cE}{B}$$

it is seen that electric field gradients of the order of 40 kilovolts per centimeter and magnetic flux densities of the order of 40 kilogauss are required to reach kinetic thermonuclear temperatures of about 10 kev with a fuel density of sufficient magnitude to provide power densities of interest, e.g., $10^{15}$ ions per cc. of a 50–50 DT mixture and a rate of release of charged particle kinetic energy of 100 watts per cc. The former present a particularly challenging problem, especially if an attempt is made to apply the total electric potential between co-axial electrodes with a gap length of several centimeters or more, as the gap length for breakdown in S.T.P. air of such immense (megavolt) potentials may run into tens of feet.

The other remaining obstacle to attaining thermonuclear temperatures is the prevention of the leakage of impurities into the plasma. Such impurities, particularly those consisting of heavy element ions, increase Brehmsstrahlung radiation losses and thus dissipate energy which would otherwise be used in raising the kinetic temperature of the thermonuclear fuel.

The present inventors believe that they have conceived methods of avoiding the problems mentioned above. Some other method of obtaining the required gradient than simply applying the total potential between a center or core electrode and co-axial outer or shell electrode is necessary. The problem is not avoided by connecting a bank of capacitors in series and then connecting such intercapacitor leads to a series of concentric ring electrodes to obtain a withstandable gradient between electrodes, as the electric field not far from the electrodes redistributes itself without regard to such inter-electrode distribution and inevitably breaks down the air in its path.

An arrangement suitable for obtaining the necessary electric gradient which avoids the above-mentioned difficulties is illustrated in FIG. 7. As there shown schematically, there are ten co-axial end electrodes 101, five of which are connected in parallel to the positive terminal of the capacitor bank and the other five to the negative terminal. Thus there is no higher applied gradient between electrodes than the capacitor voltage divided by the radial electrode spacing. With the capacitor charged to e.g., 80 kv., and a gap of 2.0 cm., a gradient of 40 kv. per cm. can be obtained.

In the region outside the reactor proper, it is necessary to increase the gap breakdown strength over the comparatively low value of air at standard temperature and pressure, either by decreasing or increasing the pressure in accordance with Paschen's law or by providing a high dielectric strength material between electrodes and extending such material into the space adjacent the electrodes to increase its dielectric strength and increase the length of the air breakdown paths, or both. Inside the reactor proper, such steps are unnecessary, as the discharge is circumferential rather than radial, as would be required for direct conduction between electrodes.

The schematic arrangement shown in FIG. 7 in practice takes such form as is necessary to minimize the inductance of the connecting leads. The capacitor bank consists of a group of individual capacitors connected through spark gaps or ignitrons to a pair of bus bars, which may be extended as closely to the group of end electrodes as is consistent with insulation requirements. One or more co-axial cables of low inductance are connected between this pair of bus bars to a pair of adjacent electrodes in such manner that alternate electrodes are connected to bus bars of alternate polarity.

The effect of such methods of voltage application is of course to reverse the direction of the electric field within the reactor several times in radially traversing the reactor. The corresponding effect on the plasma rotation is also illustrated in FIG. 7 by the azimuthal arrows between electrodes. These arrows illustrate the motions of both ions and electrons and show that their azimuthal drifts change direction from one layer to the next, thus making the reactor in operation a sort of reciprocating anion. The abrupt changes in direction of motion at the interfaces of layers are helpful rather than otherwise, as the relative velocity between particles in adjacent layers is thereby doubled and the probability that collisions between such particles will result in fusion reactors is correspondingly enhanced.

An alternative to the arrangement of FIG. 7 is presented in FIG. 8. Since the magnetic flux lines diverge after leaving the magnetic mirror M to complete their return paths, the electrodes 102 may conveniently be located at a point external to the reactor 1, where extended insulation 103 may be used in both directions and the electrodes and insulation may be completely enclosed in a pressurized gas to increase the breakdown strength. Since the magnetic surfaces are equipotentials in the presence of an ionized plasma and such potentials may be fixed by the potentials of external energized electrodes through which such flux surfaces pass, it is immaterial whether or not such electrodes take the form of co-axial rings of increasing size lying in a common plane, so long as they contact such flux surfaces at some point.

To eliminate or reduce the problem of impurities in the plasma, the outer electrode is made negative, so that positive ions ejected from the outer electrode 104 will tend to be turned back by the strong electric field before they can penetrate deeply into the plasma. As they are ejected, they are also bent back by the magnetic field to return harmlessly to the wall. It is noteworthy also that container-electrode 104 may be replaced by a non-conductive material, and an additional electrode 103 of negative polarity added to the right of the array shown in FIG. 8, this last electrode being one in contact with the flux surface near the outside of the flux within the reactor.

What is claimed is:

1. A neutron and light source comprising in combination an elongated, gas-tight, electrically conductive container, means for obtaining an ionized plasma of a low density gas within said container, said gas being selected from the class consisting of deuterium and deuterium and tritium, coil means surrounding said container for obtaining a longitudinal magnetic field therein and having a minimum strength near the midplane thereof and a maximum near each end, and electrode and associated power supply means for obtaining a radial electric field within said container in the presence of said ionized plasma, said electrode means comprising at least one electrode disposed to contact the central flux lines of said magnetic field and said power supply means having its output connected to said electrode and said container.

2. The neutron and light source of claim 1 in which said means for obtaining an ionized plasma is a plasma injector, said plasma injector comprising an elongated gas-tight tube flow-connected at one end to an end of said container and at the other to a source of said gas, an electromagnetic valve disposed near said other end of said tube, a shock coil surrounding said tube intermediate said ends, and a solenoid surrounding said tube between said shock coil and said container.

3. The neutron and light source of claim 2 in which said electrode and power supply means comprises an end electrode located near at least one end of said container in contact with said plasma, said end electrode being of small cross section relative to said container, of small thickness relative to the length of said container and disposed co-axially therewith, and said power supply means is connected between said container and said at least one end electrode.

4. The neutron and light source of claim 3 in which there is one such end electrode at each end of said container and said end electrodes are connected to a common terminal of said power supply means.

5. The neutron and light source of claim 4 in which said gas is deuterium and said gas density corresponds to a filling pressure of 1–1.5 microns Hg, said magnetic field strength has initial values of about 6–10 kilogauss at said center plane and about 2.2 times such strength at said ends and is supplied from an essentially D.-C. source, and said power supply means includes in series a switching means and a capacitor bank precharged to about 10–40 kilovolts.

6. The neutron and light source of claim 5 in which said capacitor bank has a capacitance of about 75 microfarads and said container has a bore of about 24 centimeters.

7. The neutron and light source of claim 1 in which said means for obtaining an ionized plasma comprises conventional means for filling said container with said gas in an unionized condition, a first capacitor bank and switching means for energizing said coil means such that such energizing circuit has a very short time constant, a second capacitor bank and switching means to provide a discharge circuit for said coil such that said discharge circuit has a very long time constant, and associated control means for closing said second switching means at the peak of the second half-cycle of current through said coil.

8. The neutron and light source of claim 7 in which said energizing circuit has a time constant not exceeding about 24 microseconds.

9. The neutron and light source of claim 7 in which said gas is deuterium at an initial pressure of about 1–1.5 microns Hg, and said electrode and power supply means comprises an end electrode at at least one end of said container in contact with said plasma, said at least one end electrode being small in cross section and thickness relative to said container and disposed co-axially therewith, said power source consisting of a precharged condenser bank and switching means in series with said container and said at least one electrode.

10. The neutron and light source of claim 9 in which said longitudinal magnetic field has a strength of about 6–9 kilogauss at said center plane and 2.2 times this value at said ends, and said condenser bank is precharged to about 10–40 kilovolts.

References Cited in the file of this patent

UNITED STATES PATENTS 2,868,991    Josephson et al. _____ Jan. 13, 1959

OTHER REFERENCES

Proceedings of the Second United Nations International Conference on the Peaceful Uses of Atomic Energy, vol. 31, United Nations, Geneva 1958. Held in Geneva Sept. 1, Sept. 13, 1958, pp. 319–324.

Project Sherwood by Amasan S. Bishop, Sept. 1958, Addison Wesley Publishing Co., Reading, Mass., pp. 127–131.